(12) United States Patent
Noorkami et al.

(10) Patent No.: US 11,722,540 B2
(45) Date of Patent: Aug. 8, 2023

(54) DISTRIBUTED ENCODING

(71) Applicant: Apple Inc., Cupertino, CA (US)

(72) Inventors: Maneli Noorkami, Menlo Park, CA (US); Ranjit Desai, Cupertino, CA (US); Joel N. Kerr, San Jose, CA (US); Perry A. Caro, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/320,191

(22) Filed: May 13, 2021

(65) Prior Publication Data
US 2022/0094731 A1 Mar. 24, 2022

Related U.S. Application Data

(60) Provisional application No. 63/083,089, filed on Sep. 24, 2020.

(51) Int. Cl.
*H04L 65/70* (2022.01)
*G06F 3/01* (2006.01)
(Continued)

(52) U.S. Cl.
CPC ............ *H04L 65/70* (2022.05); *G02B 27/017* (2013.01); *G06F 3/012* (2013.01); *H04L 65/762* (2022.05); *H04L 65/80* (2013.01)

(58) Field of Classification Search
CPC ....... H04L 65/70; H04L 65/762; H04L 65/80; G02B 27/017; G06F 3/012; H04N 21/2343
See application file for complete search history.

(56) References Cited

U.S. PATENT DOCUMENTS 9,158,375 B2   10/2015   Maizels et al.
9,383,582 B2   7/2016    Tang et al.
(Continued)

FOREIGN PATENT DOCUMENTS

EP   2257046 A2   12/2010
EP   2824884 A1   1/2015
(Continued)

OTHER PUBLICATIONS

International Search Report and Written Opinion in PCT Appl. No. PCT/US2021/043044 dated Oct. 28, 2021, 15 pages.
(Continued)

*Primary Examiner* — Wing F Chan
*Assistant Examiner* — Billy H Ng
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to encoding recorded content for distribution to other computing devices. In some embodiments, a first computing device creates recorded content for transmission to a second computing device configured to present the recorded content. To encode the recorded content, the first computing device detects, via a network interface of the first computing device, one or more computing nodes available to encode the recorded content in one or more formats supported by the second computing device. The first computing device offloads the recorded content via the network interface to the one or more computing nodes for encoding in the one or more formats. In some embodiments, the second computing device receives a request from a user to stream content recorded by a first
(Continued)

computing device and requests the content in a first format being encoded by a computing node assisting the first computing device.

20 Claims, 7 Drawing Sheets

(51) Int. Cl.
*G02B 27/01* (2006.01)
*H04L 65/80* (2022.01)
*H04L 65/75* (2022.01)

(56) References Cited

U.S. PATENT DOCUMENTS

| | | | |
|---|---|---|---|
| 9,488,488 B2 | 11/2016 | Waldman | |
| 9,685,004 B2 | 6/2017 | Wang et al. | |
| 11,032,570 B2 | 6/2021 | Fan et al. | |
| 2007/0239896 A1* | 10/2007 | Sohn | H04N 7/17318 709/219 |
| 2015/0334094 A1* | 11/2015 | Suresh | H04L 45/00 713/153 |
| 2016/0203648 A1 | 7/2016 | Bilbrey et al. | |
| 2016/0360180 A1 | 12/2016 | Cole et al. | |
| 2018/0027181 A1 | 1/2018 | Roulet et al. | |
| 2018/0342043 A1 | 11/2018 | Vandrotti et al. | |
| 2019/0132194 A1* | 5/2019 | Joshi | H04L 41/0846 |
| 2019/0260814 A1* | 8/2019 | Amini | H04L 1/0033 |
| 2020/0312005 A1 | 10/2020 | Desai et al. | |
| 2022/0155595 A1* | 5/2022 | Wang | G06F 3/147 |
| 2022/0201342 A1* | 6/2022 | Björkman | H04N 21/2187 |

FOREIGN PATENT DOCUMENTS

| | | |
|---|---|---|
| EP | 2824885 A1 | 1/2015 |
| EP | 3668092 A1 | 6/2020 |
| GB | 2567012 A | 4/2019 |
| WO | 2014105264 | 7/2014 |
| WO | 2019/195101 A1 | 10/2019 |

OTHER PUBLICATIONS

You et al., "OMAF4CLOUD: Standards-Enabled 360° Video Creation as a Service," Sep. 1, 2019 (Sep. 1, 2819). pages 1-9; XP055775641; Retrieved from the Internet: URL:https://www.researchgate.net/profile/YuYou2/publication/335991664 OMAF4CLOUD Standards-Enabled 368 Video Creation As A-SERVICE/links/5d89d8db92851ceb793acc3e/OMAF4CLOUD-STANDARDS-ENABLED-360-VIDEO-CREATION AS-A-SERVICE.pdf.

Schneider et al., "Augmented reality based on edge computing using the example of remote live support," 2017 IEEE International Conference on Industrial Technology, Mar. 22, 2017 (Mar. 22, 2017), pp. 1277-1282, XP033091243.

Hou et al., "'Wireless VR/AR with Edge/Cloud Computing,"2017 26th International Conference on Computer Communication and Networks, Jul. 31, 2017, pp. 1-8, XP033153948.

"Text of ISO/IEC FDIS 23090-8 Network-based Media Processing," 129. MPEG Meeting; Jan. 13, 2020-Jan. 17, 2020; Brussels; (Motion Picture Expert Group or ISO/IEC JTC1/SC29/WG11),No. n19062, Mar. 25, 2020 (Mar. 25, 2020), XP030285349, whole document.

Zhiqiang et al., "Research and design of Cloud architecture for smart home," 2010 IEEE International Conference on Software Engineering and Service Sciences, Jul. 16, 2010 (Jul. 16, 2010), pp. 86-89, XP031734984.

International Search Report and Written Opinion in PCT Appl. No PCT/US2021/043763 dated Oct. 27, 2021, 16 pages.

Schneider et al., "Augmented Reality based on Edge Computing using the example of Remote Live Support," 2017 IEEE International Conference on Industrial Technology, Mar. 22, 2017, pp. 1277-1282.

"Potential improvement for OMAF," 131. MPEG Meeting; Online (Motion Picture Expert Group or ISO/IEC JTC1/SC29/WG11), No. n19435, Jul. 30, 2020, whole document.

* cited by examiner

DISTRIBUTED ENCODING

The present application claims priority to U.S. Prov. Appl. No. 63/083,089, filed Sep. 24, 2020, which is incorporated by reference herein in its entirety.

BACKGROUND

Technical Field

This disclosure relates generally to computing devices, and, more specifically, to encoding recorded content for distribution to other computing devices.

Description of the Related Art

Various streaming services have become popular as they provide a user the opportunity to stream content to a variety of devices and in a variety of conditions. To support this ability, various streaming protocols, such as MPEG-DASH and HLS, have been developed to account for these differing circumstances. These protocols work by breaking up content into multiple segments and encoding the segments in different formats that vary in levels of quality. When a user wants to stream content to a mobile device with a small screen and an unreliable network connection, the device might initially download video segments encoded in a format having a lower resolution. If the network connection improves, the mobile device may then switch to downloading video segments encoded in another format having a higher resolution.

Figure 1:
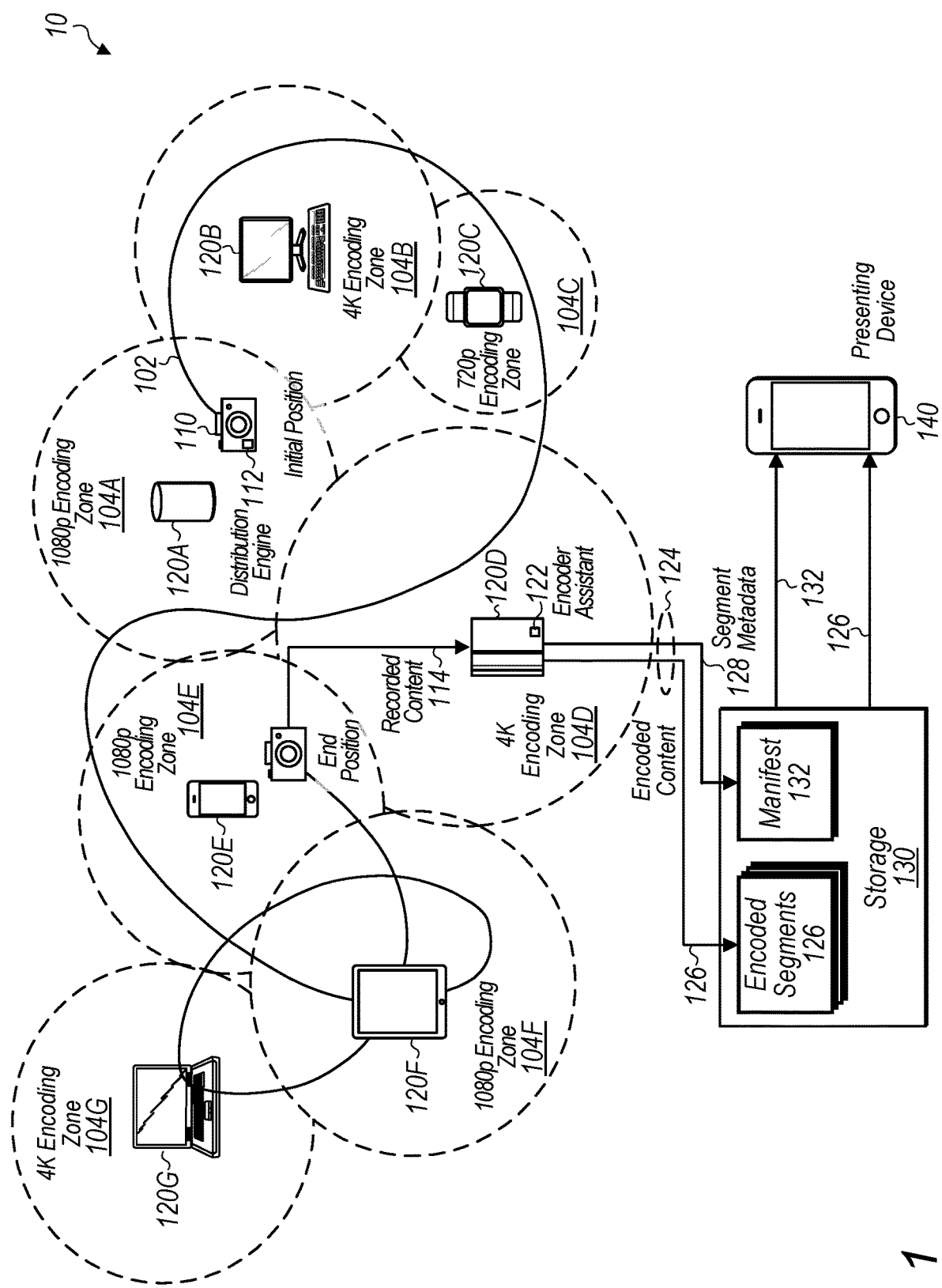
FIG. 1 is a block diagram illustrating one embodiment of a distributed encoding system for encoding recorded content.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computing device configured to record content" is intended to cover, for example, hardware (e.g., a camera, microphone, memory to store content, etc.) that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in an encoding system having multiple computing nodes, the terms "first" and "second" computing nodes can be used to refer to any two computing nodes. In other words, the "first" and "second" computing nodes are not limited to the initial two computing nodes detected for encoding content, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some instances, a user may be recording content on a device and want to stream the content to one or more other devices. For example, a user may be using their phone to record a video and want to stream it to a friend's device. Being a phone, however, the recording device may have a limited ability to encode content in multiple formats for facilitating streaming to the friend's device—e.g., due the phone's limited battery power supply, limited compute, limited network connectivity, etc. Still further, a user may also want to walk around while creating content. For example, in an office setting, a user may want to start creating content in their office and continue creating content while walking down the hall to a conference room. If the user is attempting to live stream content, significant time restrictions and varying levels of network connectivity may also exist in order to deliver the content in a timely manner.

The present disclosure describes embodiments of a distributed encoding system in which a recording device attempts to discover other available computing devices and offload, at least, a portion of the processing and/or the encoding to those computing devices in order to expand the amount of computing resources available for encoding recorded content. As will be described in greater detail below, a recording device may, for example, collect information identifying abilities of the one or more compute devices to assist the recording device. For example, the recording device may determine that a user has a nearby phone or laptop that is not currently being used—and thus have idle compute resources available to encode recorded content in different formats. Based on this discovery, the recording device may evaluate a set of encoding operations associated with the recorded content and may offload the recorded content to the discovered device to perform one or more of the encoding operations. In various embodiments, the recording device may continue to collect information from available computing devices as operating conditions may change over time. For example, if a recording device is communicating wirelessly with a laptop and a user holding the recording device walks out of the room, the recording device may detect a loss of connectivity with the laptop and redistribute how encoding the recorded content is handled. Upon entering another room, however, the recording device may discover another available device that can assist in encoding content, such as a user's tablet, and determine to offload encoding content to the newly discovered device. In evaluating what encoding operations get offloaded, the recording device may consider many factors pertaining to compute resources, quality of service, security, etc. in an effort to meet various objectives pertaining to, for example, precision, accuracy, fidelity, processing time, power consumption, privacy considerations, etc. Dynamically discovering compute resources and redistributing the encoding of recorded content among these resources in real time based on these factors can allow a much better streaming experience than if the user were confined to only the limited resources of the recording device. Furthermore, dynamically discovering compute resources may allow for greater mobility when creating content as a recording device may be able to discover additional compute resources when transitioning from one space to another.

Turning now to FIG. 1, a block diagram of distributed encoding system 10 is depicted. In the illustrated embodiment, system 10 includes a recording device 110, multiple computing nodes 120, a storage 130, and a presenting device 140. As shown, recording device 110 may include a distribution engine 112. Each computing node 120 may also include a respective encoder assistant 122. In some embodiments, system 10 may be implemented differently than shown. For example, more (or less) computing nodes 120 may be available, multiple recording devices 110 may share one or more computing nodes 120, multiple presenting devices 140 may be used, etc.

Recording device 110, in various embodiments, is a computing device configured to create recorded content 114. Accordingly, recording device 110 may correspond to any of various devices that include one or more cameras to record video content and/or one or more microphones to record audio content. For example, recording device 110 may be a phone, camera, tablet, laptop, desktop computer, headphones/earphones, speaker arrays, input systems (e.g., wearable or handheld controllers with or without haptic feedback), etc. As another example discussed below with FIG. 6, recording device 110 may be a head mounted display, such as, a headset, helmet, goggles, glasses, a phone inserted into an enclosure, etc. and may include one or more forward facing cameras to capture content in front of a user's face. As yet another example, recording device 110 may correspond to a vehicle dash recording system. Although various examples will be described herein in which recorded content 114 includes video or audio content, recorded content 114 may also include sensor data collected from one or more sensors in record device 110 such as world sensors 604 and/or user sensors 606 discussed below with respect to FIG. 6. For example, in some embodiments, recording device 110 collects sensor data from one or more sensors (e.g., gyroscopic sensors, locations sensors, etc.) configured to determine an orientation of recording device 110 during creation of recorded content 114. This sensor data may then be provided with the recorded content 114 in order to orientate a subsequent presentation of the recorded content 114. Accordingly, if a user of recording device 110 is panning recording device 110 left and right to create a panoramic view, a gyroscopic sensor of the recording device 110 may detect the movement and record corresponding sensor data in order to allow similar movement in a subsequent presentation of the recorded content 114.

In some embodiments, recorded content 114 may also include computer-generated reality (CGR) content such as augmented reality (AR) content (or mixed reality (MR) content) in which one or more virtual objects are superimposed over a physical environment captured by one or more cameras included in recording device 110. A physical environment refers to a physical world that people can sense and/or interact with without aid of electronic devices. The physical environment may include physical features such as a physical surface or a physical object. For example, the physical environment may correspond to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include AR content, MR content, VR content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands). Accordingly, recorded content 114 may include any of various XR content. For example, in a museum setting, a user may record content 114 from an exhibit that has a physical item along with information about the item that is super imposed next to the physical item.

As noted above, a user of recording device 110 may want to share recorded content 114 with other users of other devices that are configured to present the recorded content such as presentation device 140. For example, a user may want to use their phone to live stream (i.e., stream in real-time) a current experience to devices of friends and family—and potentially be mobile with recording device 110 as will be discussed. To enable this sharing, in various embodiments, recorded content 114 may be encoded to facilitate streaming. That is, recorded content 114 may be broken into segments that are encoded in variety of formats associated with different levels of quality. A presenting device 140 streaming recorded content 114 can then select between these formats based on the properties of its display and its current network connectivity. As also noted above, however, recording device 110 may have insufficient computing resources to handle encoding recorded content 114 in these multiple formats in a timely manner. To account for this deficiency, recording device 110 may employ the computing resources of computing nodes 120.

Computing nodes 120, in various embodiments, are nodes available to assist recording device 110 in encoding recorded content 114. Computing nodes 120 may be (or may include) any type of computing system or computing device. For example, as shown in FIG. 1, compute nodes 120 include a wireless speaker 120A, workstation 120B, watch 120C, high-performance compute (HPC) device 120D, phone 120E, tablet 120F, and laptop 120G. Other examples of such computing nodes 120 may include set-top boxes, game consoles, game systems, internet of things (IoT) devices, home network devices, and so on. In some embodiments, computing nodes 120 may generally be classified into primary, second, and tertiary compute meshes/groups. The primary compute mesh includes computing nodes 120 belonging to a user of recording device 110 (or belonging to a user's friends and family). These computing nodes 120 may provide less compute ability than computing nodes 120 in other meshes but may be readily available to the user of recording device 110. Many of the compute nodes 120 depicted in FIG. 1 may correspond this mesh. The secondary compute mesh includes nearby computing nodes 120, which may provide greater compute ability at greater costs and, in some instances, may be shared by multiple recording devices 110. For example, a user operating recording device 110 may enter a concert venue having a workstation 120B and/or HPC 120D and may be able to receive assistance from such a node 120 in order to encode recorded content. The tertiary compute mesh includes high-performance computing nodes 120 available to a user though cloud-based services. For example, a server cluster may be based at a server farm remote from recording device 110 and may implement support for encoding recorded content 114. In such an embodiment, computing nodes 120 may also include logical computing nodes such as virtual machines, containers, etc., which may be provided by the server cluster.

Computing nodes 120 may thus vary substantially in their abilities to assist recording device 110. Some computing nodes 120, such as phone 120E, may have limited processing ability and be power restricted such being limited to a five-watt battery power supply while other nodes, such as a server cluster, may have almost unlimited processing ability and few power restrictions such as being capable of delivering multiple kilowatts of compute. Computing nodes 120 may also vary in their abilities to perform particular tasks. For example, HPC 120D may include specialized hardware such as image signal processors (ISPs) having dedicated circuitry for performing particular encoding operations. Computing nodes 120 may vary in their abilities to perform operations securely. For example, phone 120E may include a secure element (such as secure element 640 discussed below with FIG. 6) configured to securely store and operate on confidential data while workstation 140B may be untrusted and accessible over an unencrypted wireless network connection.

In various embodiments, availability of computing nodes 120 may also be dynamic in nature—in part as recording device 110 (or nodes 120) may be in motion causing a change in connectivity and in part as nodes 120 may be handling other tasks. As shown in FIG. 1, for example, a user operating recording device 110 may start recording content 114 at an initial position and move along a path 102 to end position where the user stops recording content 114. While recording device 110 moves along path 102, recording device 110 may detect, via its network interface, one or more computing nodes 120 available to encode recorded content 114 in one or more formats and offload the recorded content 114 via the network interface to one or more computing nodes 120 for encoding in the one or more formats. For example, recording device 110 may initially detect a wireless speaker 120A having sufficient capabilities to encode recorded content at a 1080p resolution as shown by 1080p encoding zone 104A. In the illustrated embodiment, zones 104 are meant to represent a spherical area in space, which may (or may not) be adjacent to each other, and may even overlap. One zone 104, for example, might be in the living room, another in the kitchen, one in an office, another in a conference room, etc. As recording device 110 leaves this zone 104A, recording device 110 may experience a drop in wireless connectivity with wireless speaker 120A and lose the ability for it to assist in encoding content 114. As shown, however, recording device 110 may detect workstation 120B upon entering 4K encoding zone 104B and gain the ability to have recorded content encoded at a 4K resolution. As recording device 110 continues along path 102 may detect other computing node 120 and gain or lose additional computing resources. For example, while passing back through encoding zone 104A and on to encoding zone 104E, recording device 110 may be unable to detect another computing node 120 and thus may need to rely on only its own computing resources for encoding content 114. As noted above, availability of computing nodes 120 may also be dynamic in nature as their computing resources get used for other purposes. For example, recording device 110 may continue to maintain wireless connectivity with tablet 120F but lose its assistance if someone picks up tablet 120F and begins using it for some other computationally intensive purpose.

Distribution engine 112, in various embodiments, is executable by recording device 110 to discover computing nodes 120 and determine whether to offload encoding recorded content 114 to the discovered computing nodes 120. As will be described in greater detail with respect to FIG. 2, distribution engine 112 may make this determination based on various encoding capability information received from compute nodes 120. This encoding capability information may refer generally to any suitable information usable by engine 112 to assess whether recorded content 114 should (or should not) be offloaded to particular computing nodes 120 for encoding. In some embodiments, this information includes an indication of one or more formats supported by the computing node 120. For example, watch 120C may indicate that it supports H.264/AVC 720p encoding at 30 frames per second (fps). In some embodiments, this encoding capability information includes compute information identifying a current utilization of one or more compute resources included in the computing node 120 and that are usable to facilitate encoding of the recorded content by the computing node. For example, tablet 120F may indicate that it is currently using only 5% of its multi-core processor and would be able to allocate 1 GB of RAM for use in encoding recorded content 114. In some embodiments, this encoding capability information includes information that is usable to determine whether a particular computing node belongs to a primary mesh as discussed above (i.e., belongs to the user of recording device 110 or belongs to a friend or family member of recording device 110) and thus is authorized to assist recording device 110. For example, distribution engine 112 may receive, from a computing node 120, an indication of a user associated with the computing node 120 and determine whether the user corresponds a user of recording device 110. In some embodiments, this encoding capability information includes information a computing node 120's security capabilities, which may be indicative of how securely a node 120 can maintain and process recorded content 114. For example, as will be discussed with FIG. 4, distribution engine 112 may receive, from a computing node 120, a signed attestation identifying a presence of secure hardware within the computing node 120. Since the abilities of computing nodes 120 may change over time, in some embodiments, distribution engine 112 may continually receive encoding capability information from compute nodes 120 in real time while recording device 110 records content 114 and nodes 120 encode content 114.

Based on this received encoding capability information, distribution engine 112 may determine whether to offload recorded content 114 to computing nodes 120 for encoding recording content 114. In some embodiments, distribution engine 112 evaluates this encoding capability information against a set of encoding constraints by using a cost function that attempts to minimize, for example, power consumption and latency while ensuring that the best user experience is delivered. This evaluation may continue while recording is ongoing. For example, while a computing node 120 encodes offloaded recorded content 114 in a first format, engine 112 may receive, from the computing node 120, updated compute information identifying a current utilization of the one or more compute resources and, based on the updated compute information, selecting a second, different format (e.g., one that is less computationally intensive) to be used by the computing node 120 for encoding recorded content 114. As another example, while offloading recorded content 114 to one or more computing nodes 120, engine 112 may detect another computing node 120 available to encode recorded content 114 and offload recorded content 114 to the other computing node 120 for encoding recorded content 114. In some embodiments, distribution engine 112 may attempt to be proactive (as opposed to reactive) in its assessment of whether to offload recorded content 114. That is, prior to creating recorded content 114, engine 112 may determine that a user of recording device 110 is likely to begin creating the recorded content (e.g., based on a user's past behavior) and, based on the determining, attempt to detect one or more computing nodes 120 to facilitate a subsequent encoding of the recorded content. Although depicted within recording device 110, distribution engine 112 may reside elsewhere and, in some embodiments, in multiple locations. For example, a first instance of distribution engine 112 may reside at recording device 110 and a second instance of distribution engine 112 may reside at wireless speaker 120A. In such an embodiment, the distribution engine 112 at wireless speaker 120A may collect encoding capability information from one or more other computing nodes 120 and provide recorded content 114 offloaded from recording device 110 to the other computing nodes 120.

Encoder assistant 122, in various embodiments, is executable by computing nodes 120 to interface with distribution engine 112 and facilitate encoding of offloaded recorded content 114. Accordingly, an encoder assistant 122 may advertise, via a network interface of its computing node 120, an ability to encode content via one or more supported codecs, receive, from recording device 110 responding to the advertising, a request to encode recorded content 114 and, in response to the request, use one of the supported codecs to encode the recorded content in a format supported by presenting device 140. As part of interfacing with distribution engine 112, assistant 122 may collect and provide the various encoding capability information discussed above and in greater detail below. For example, assistant 122 may provide, to recording device 110, information indicative of a quality of service for a network connection established with recording device 110 via the network interface. As another example, assistant 122 may provide, to recording device 110, an indication of a user account registered to the computing node. As yet another example, assistant 122 may provide, to recording device 110, a signed attestation identifying a manufacturer of the computing node 120 and usable to determine hardware present in the computing node 120. Based on this provided information, encoder assistant 122 may receive offloaded recorded content 114 to encode. As will be discussed in greater detail below with FIG. 3, encoder assistant 122 may include one or more video and/or audio codecs usable to produce encoded content 124. As shown in FIG. 1, this encoded content 124 may include multiple encoded segments 126 and segment metadata 128, which assistant provides to storage 130.

Storage 130, in various embodiments, is configured to store encoded content 124 and facilitate streaming encoded content 124. Encoded segments 126 are small portions recorded content 114 that encoded in multiple formats. For example, recorded content 114 may be broken up into ten-second portions. Each portion is then encoded in multiple formats such as a first group of segments 126 encoded in 480p, a second group of segments 126 encoded in 720p, and so forth. Manifest 132 stores metadata 128 about each segment 126 so that a presenting device 140 can select the appropriate segments 126. For example, manifest 132 may include a uniform resource identifier (URI) indicating where the 720p segments 126 are located for a particular recorded content 114 and available for download. In various embodiments, storage 130 may support the streaming of encoded content 124 via the HyperText Transfer Protocol (HTTP) and using a streaming protocol such as HTTP Live Streaming (HLS), Moving Picture Experts Group Dynamic Adaptive Streaming over HTTP (MPEG-DASH), etc. In an embodiment in which HLS is used, manifest 132 is implemented using one or more .m3u8 files. In an embodiment in which MPEG-DASH is used, manifest 132 implements a Media Presentation Description (MPD). In some embodiments, storage 130 may be a single computing device such as one of computing nodes 120, a network attached storage, etc. In other embodiments, storage 130 may be provided by a computer cluster implementing a cloud-based storage.

Presenting device 140, in various embodiments, is configured to download encoded content 124 and present the encoded content to a user of presenting device 140. Accordingly, presenting device 140 may initially receive a request from a user to stream content 114 recorded by recording device 110. In some embodiments, presenting device 140 then downloads manifest 132 identifying segments 126 in multiple formats and uses manifest 132 to select one of the formats for streaming. Presenting device 140 may request encoded content 124 in a first format based on variety of factors including a quality of a network connection, a display resolution of presenting device 140, a desired minimum frame rate, a desired minimum latency, etc. In response to determining that the quality of the network connection has changed, presenting device 140 may requesting encoded content 124 in a second format based on the changed quality of the network connection. If multiple computing nodes 120 assisted recording device 110, the content in the first format may be encoded by a first computing node (e.g., wireless speaker 120A) while the content in the second format may be encoded by a second computing node (e.g., workstation 120B). Although depicted as a phone, presenting device 140 may correspond to any suitable device such as those noted above or discussed below.

Like recording device 110, in some embodiments, presenting device 140 may also be in motion, which may affect how presenting device 140 streams encoded content 124. For example, as presenting device 140 moves around its network connectivity may be altered causing device 140 to stream lower or higher quality encoded content 124. As another example, although presenting device 140 is shown in FIG. 1 as downloading encoded content 124 from storage 130, presenting device 140, in some embodiments, may download encoded content 124 directly from nodes 120. For example, in a park setting, presenting device 140 may initially download encoded content 124 from storage 130, which may be accessible over a cellular connection in this example. Upon entering an area of the park corresponding to zone 104G, which may be located near a park zoo, presenting device 140 may transition to downloading 4K segments 126 directly from the compute device 120D over Wi-Fi®, rather than go through storage 130. Such an implementation may enable performance and/or quality improvements to be gained if segment 126 can be pulled directly from the nearest compute node zone 104.

Figure 2:
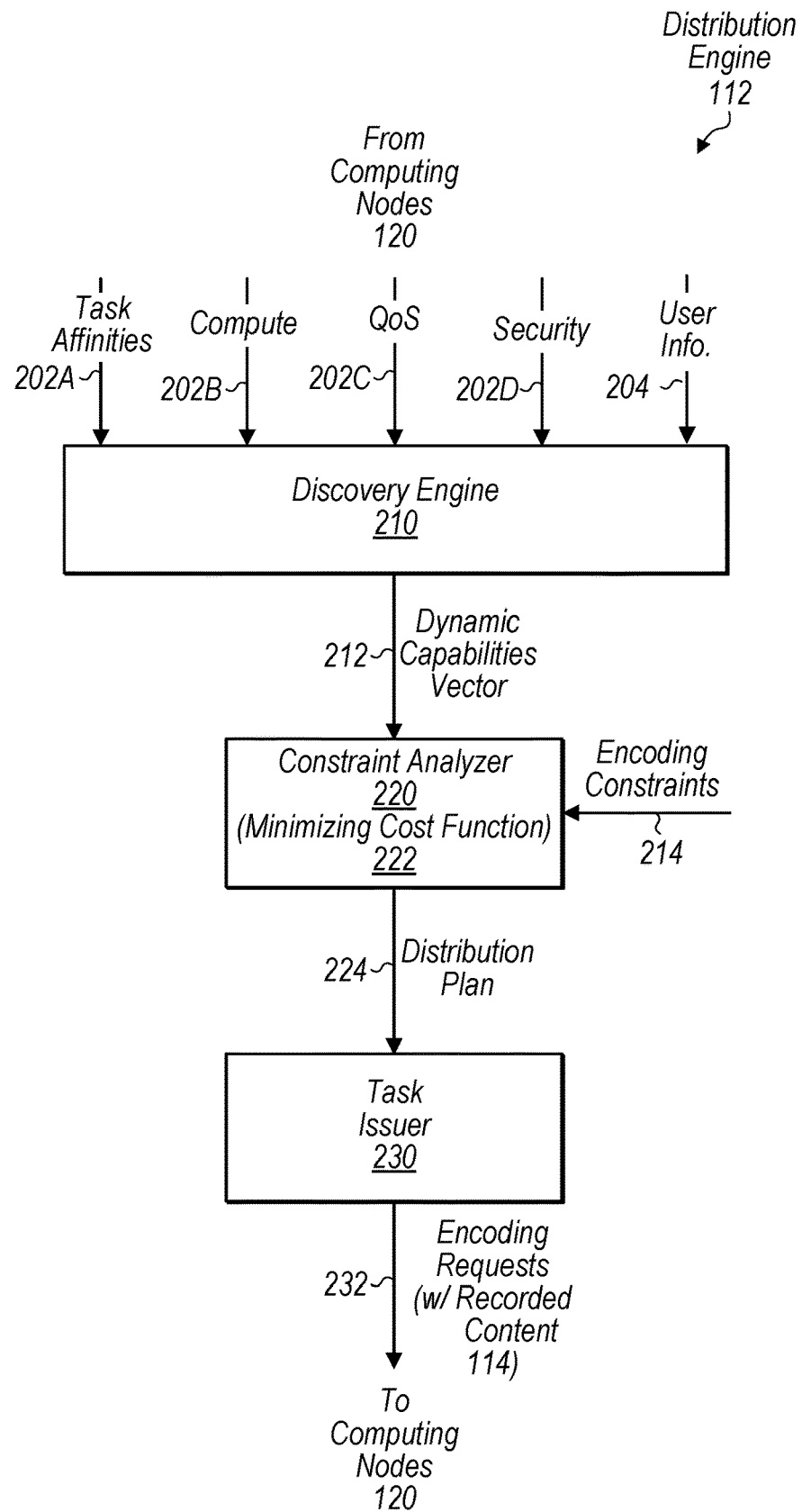
FIG. 2 is a block diagram illustrating one embodiment of a distribution engine included in a recording device.

Turning now to FIG. 2, a block diagram of distribution engine 112. In the illustrated embodiment, distribution engine 112 includes a discovery engine 210, constraint analyzer 220, and a task issuer 230. In other embodiments, engine 112 may be implemented differently than shown.

Discovery engine 210, in various embodiments, handles discovery of available computing nodes 120 and collection of encoding capability information 202. Discovery engine 210 may use suitable techniques for discovering computing nodes 120. For example, engine 210 may employ a protocol such as simple service discovery protocol (SSDP), Wi-Fi® Aware, zero-configuration networking (zeroconf), etc. In some embodiments, discovery engine 210 discovers computing nodes 120 by sending a broadcast soliciting assistance from any available computing nodes 120 and learning about computing nodes 120 based on their responses. As used herein, the term "broadcast" is to be interpreted in accordance with its established meaning and includes a communication directed to more than one recipient. For example, if communication over a network connection is using Internet Protocol version 4 (IPv4), discovery engine 210 may send one or more packets to a broadcast address having a host portion consisting of all ones. In various embodiments, this broadcast may be conveyed across a local area network accessible to recording device 110 in order to identify other nodes 120 that are a part of the network. In some embodiments, discovery engine 210 may receive broadcasted notifications from computing nodes 120. That is, rather responding to any solicitation of discovery engine 210, a computing node 120 may send a notification indicating that it is available to assist any recording device 110 that happens to need assistance.

In various embodiments, discovery engine 210 aggregates capability information 202 received from computing nodes 120 into dynamic constraint vectors 212 and conveys them to constraint analyzer 220. In some embodiments, a constraint vector 212 may include information 202 about a single node 120; in other embodiments, a vector 212 may be multi-dimensional and include information 202 from multiple nodes 120. A given vector 212 may also include current information as well as previously collected information associated with past encodings of recorded content 114. In such an embodiment, engine 210 may analyze current and past information to predict future abilities of computing nodes 120 to facilitate assisting recording device 110. For example, engine 210 may employ a learning algorithm that evaluates past and present information 202 over time. In the illustrated embodiment, a dynamic constraint vector 212 includes information about task affinities 202A, compute 202B, quality of service 202C, and security 202D. In other embodiments, vector 212 may include more (or less) elements 202; aspects described below with respect to one element may also be applicable to others.

Task affinities 202A, in various embodiments, include information about a computing node's 120 ability to handle particular encoding operations. Accordingly, affinities 202A may identify the presence of particular software and/or hardware for encoding recorded content 114. For example, affinities 202A may identify the particular formats supported by a given computing node 120 based on the current software codecs installed on the computing node 120. For example, task affinities 202A received from a given node 120 may identify that supports H.264/AVC 1080p encoding at 60 fps and H.265/AVC 4K encoding at 30 fps. As another example, affinities 202A may identify that a given node 120 has a hardware image processing pipeline that includes dedicated circuitry configured to implement a particular video codec for encoding recorded content 114 in a particular format and thus is perhaps more suited for encoding recorded content 114 in the particular format than a computing node 120 that would implement the same format using a software codec.

Compute 202B, in various embodiments, includes information about a computing node 120's compute resources available to perform the encoding of recorded content 114. In some embodiments, compute 202B includes processor information of a given computing node 120 such as identifying the number of processors, types of processors, operating frequencies, the current utilization of processors, etc. In one embodiment, compute 202B may express an amount that a given computing node 120 is willing to allocate to encode recorded content 114 (e.g., 10% of its processor utilization). In some embodiments, compute 202B identifies memory information of a given computing node 120 such as identifying the types of memories, their storage capacities, the current utilization of space. In one embodiment, compute 202B may identify an amount of memory space that a computing node 120 is willing to allocate for storing content 114. In some embodiments, compute 202B includes information pertaining to the power consumption of a computing node 120. For example, in instances when a computing node 120 is using a battery supply, compute 202B may identify the current charge level of the battery and its total capacity. In instances when a computing node 120 has a plugged-in power supply, compute 202B may identify the plugged-in aspect along with the wattage being delivered. In some embodiments, compute 202B may indicate thermal information for a computing node 120. Accordingly, if a given node 120 is operating well below its thermal constraints, it may be able to accommodate a greater number of encoding operations. If, however, a given node 120 is reaching its thermal constraints, encoding operations may need to be redistributed among other nodes 120 and recording device 110.

Quality of service (QoS) 202C, in various embodiments, includes information about a compute node 120's ability to encode recorded content 114 in accordance with a particular quality of service. In some embodiments, QoS 202C includes information about how long a computing node 120 may take to handle a given encoding operation. For example, QoS 202C may identify that a particular encoding operation is expected to 20 ms based on previous instances in which the computing node 120 performed the encoding operation. In such an embodiment, distribution engine 112 may determine, for example, to not offload a given encoding operation if the time taken to offload and perform the operation as indicated by QoS 202C exceeds some threshold. In some embodiments, QoS 202C includes information about a computing node's 120 ability to communicate recorded content 114 and encoded content 124 via its network interfaces. For example, QoS 202C may identify the types of network interfaces supported by a given computing node 120 such as Wi-Fi®, Bluetooth®, etc. QoS 202C may also indicate the network bandwidth available via the network interfaces, which may be dynamic based on communication channel conditions. QoS 202C may also identify the network latencies for communicating with recording device 110. For example, QoS 202C may indicate that an Internet Control Message Protocol (ICMP) echo request takes 20 ms to receive a response.

Security 202D, in various embodiments, includes information about a computing node's 120 ability to maintain recorded content 114 and encode it in a secure manner. As noted above, recording device 110 may collect sensitive information, such as images of a user's surroundings, which may need to be protected to ensure a user's privacy. In various embodiments, distribution engine 112 may verify security capabilities as identified by security 202D before offloading recorded content 114 for encoding. In some embodiments, security 202D may identify a node's 120 ability to process information securely by identifying the presence of particular hardware such as a secure element, hardware secure module (HSM), secure processor, trusted execution environment (TEE), etc. As will be discussed below with FIG. 3, in some embodiments, elements of security 202D (as well as elements of 202A-C) may be included in a signed certificate attesting the secure capabilities of a computing node 120. In some embodiments, security 202D may identify whether a secure network connection between recording device 110 and a compute node 120 exists due to the use of encryption or a dedicated physical connection. In some embodiments, security 202D may identify whether a computing node 120 includes a biometric sensor and is configured to perform a biometric authentication of a user.

In some embodiments, discovery engine 210 collects additional information about available computing nodes 120 such as user information 204. In such an embodiment, computing nodes 120 may provide information 204 about a user (or user account) of a computing node 120. Distribution engine 112 may then compare the users identified by information 204 with a current user of recording device 110. If engine 112 determines that the computing nodes 120 and device 110 share the same user (or that a compute node 120 belongs to a friend or family member who has agreed to share compute resources), distribution engine 112 may determine that the compute node 120 is available to assist in encoding recorded content 114 and assess whether to offload recorded content 114 for encoding to that node 120. Similarly, in some embodiments, user information 204 may indicate that a set of computing nodes 120 share a common family account, which may be shared by multiple users and associated with some service such as a cloud service. In response to receiving such information 204, engine 112 may determine that recording device 110 also is associated with the family account and determine that the computing nodes 120 are available to assist in encoding recorded content 114.

Constraint analyzer 220, in various embodiments, determines how encoding operations for recorded content 114 should be distributed among recording device 110 and computing nodes 120 based on dynamic constraint vectors 212 and encoding constraints 214 associated with particular encoding operations. Accordingly, analyzer 220 may analyze the particular capabilities 202 of nodes 120 identified in vectors 212 and match those abilities to encoding constraints 214, which may define, for particular encoding operations, desired compute capabilities, latencies, network bandwidths, energy profiles, security requirements, precision, accuracy, fidelity, processing time, power consumption, privacy considerations, etc. In some embodiments, this matching may include determining multiple different distribution plans 224 for distributing encoding operations among recording device 110 and computing nodes 120 and calculating a cost function 222 for each different distribution plans 224. In various embodiments, cost function 222 is a function (or collection of functions) that determines a particular cost for a given distribution plan 224. The cost of a given plan 224 may be based on any of various factors such as total power consumption for implementing a plan 224, latency for implementing the plan 224, quality of service, etc. Based on the calculated cost functions of the different plans 224, analyzer 220 may select a particular distribution 224 determined to have the least costs (or the highest cost under some threshold amount).

Task issuer 230, in various embodiments, facilitates implementation of the distribution plan 224 selected by constraint analyzer 220. Accordingly, issuer 230 may examine distribution plan 224 to determine that an encoding operation has been assigned to a particular node 120 and send an encoding request 232 to that node 120 to perform the encoding operation. In some embodiments, issuer 230 also handles collecting any appropriate data used to perform an assigned encoding operation and conveys the data to the node 120. For example, issuer 230 may read recorded content stored in a memory of recording device 110 and communicate this information over a network connection to the computing node 120.

Figure 3:
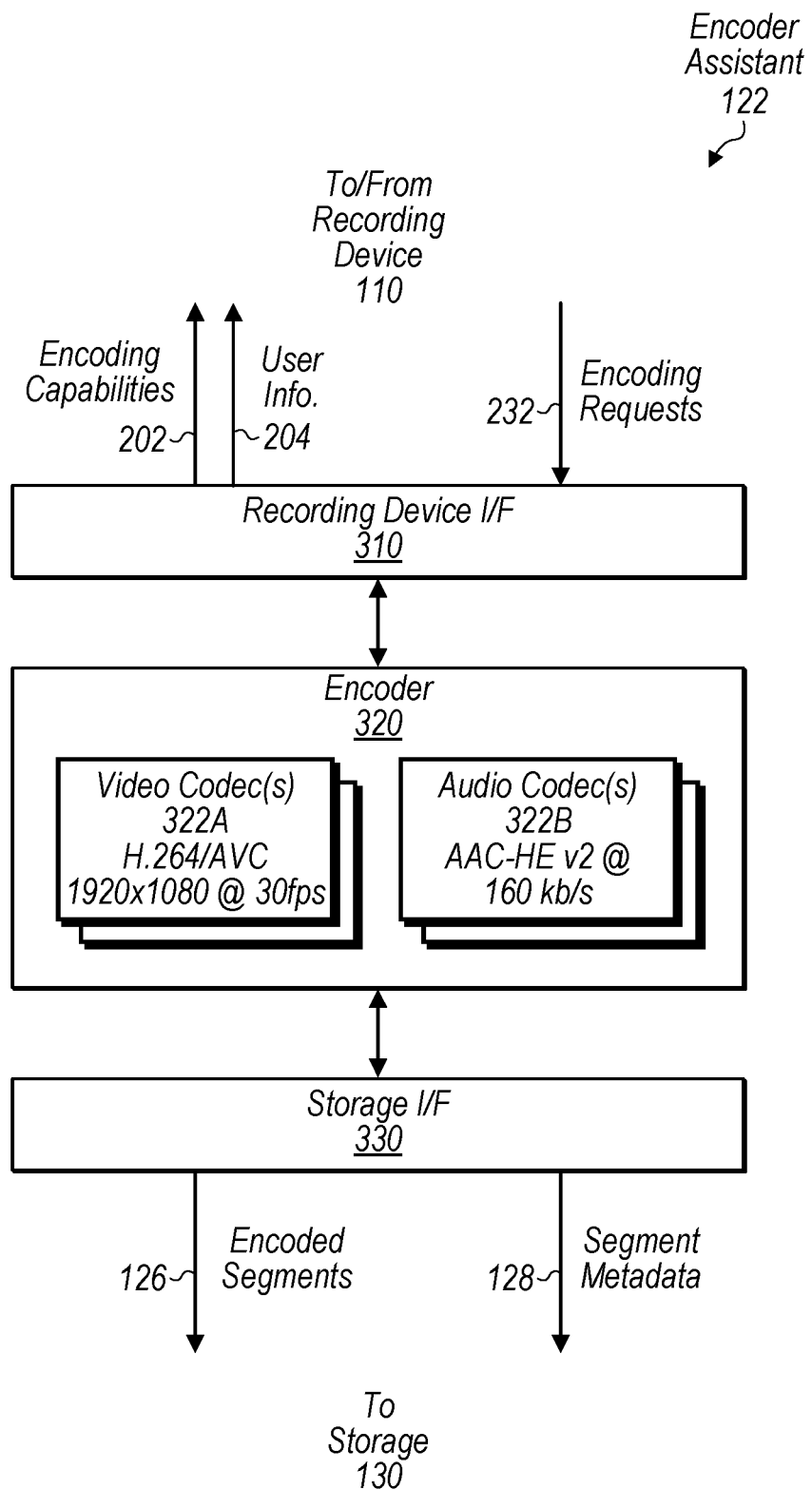
FIG. 3 is a block diagram illustrating one embodiment of an encoder assistant included in a computing node assisting in the encoding of the recorded content.

Turning now to FIG. 3, a block diagram of encoder assistant 122. In the illustrated embodiment, encoder assistant 122 includes a recording device interface 310, encoder 320, and a storage interface 330. In other embodiments, encoder assistant 122 may be implemented differently than shown.

Recording device interface 310, in various embodiments, handles communication with recording device 110. As discussed above, interface 310 may advertise the ability of a computing device 120 to assist recording device 110 using any of the techniques discussed above with FIG. 2 such as sending a broadcast communication. As shown, in some embodiments, interface 310 may collect encoding capability information 202 and user information 204 and may provide this information to record device 110. In some embodiments, interface 310 receives encoding requests 232 from recording device 110 and dispatches the recorded content 114 associated with those requests 232 to encoder 320 for processing.

Encoder 320, in various embodiments, performs the encoding of recorded content 114 in response to received encoding requests 232. Encoder 320 may thus include a various video codecs 322A and audio codecs 322B operable to produce encoded segments 126 and/or metadata 128. For example, as shown, encoder 320 may include a video codec 322A supporting H.264/AVC encoding at 1080p (1920× 1080 resolution) and at 30 fps. Encoder 320 may also include an audio codec 322B supporting AAC-HE v2 encoding at 160 kb/s. Video and audio codecs 322 may, however, support any suitable formats. In some embodiments, codecs 322 may encode content other than video and audio content such as sensor data as noted above and discussed below. In some embodiments, codecs 322 may be implemented in software that is executed by a computing node 120 to generate segments 126 and metadata 128. In some embodiments, codecs 322 may be implemented in dedicated hardware configured to generate segments 126 and metadata 128. For example, a compute node 120 may include image signal processor, a system on a chip (SoC) having an image sensor pipeline, etc. with dedicated codec 322 circuitry.

Storage interface 330, in various embodiments, handles communication with storage 130. Accordingly, interface 330 may collect encoded segments 126 produced by encoder 320 and upload them to particular locations in storage 130. In some embodiments, interface 330 may also write segment metadata 128 to manifest 132 to reflect the uploaded segments 126. For example, interface 330 may include the URIs of newly uploaded segments 126 as well as the formats in which segments 126 were encoded.

Figure 4:
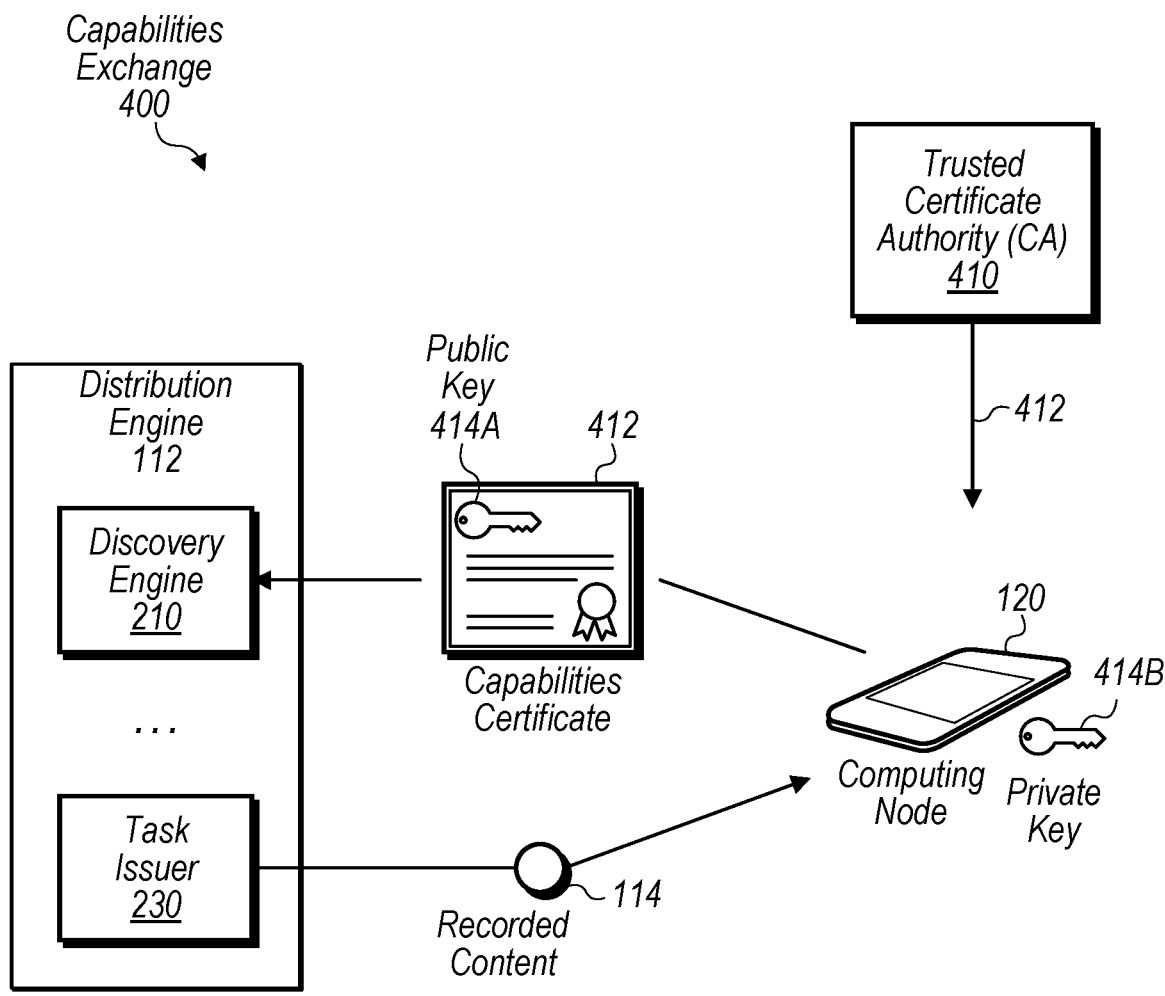
FIG. 4 is a block diagram illustrating one embodiment of a capabilities exchange between a recording device and a computing node.

Turning now to FIG. 4, a block diagram of a capabilities exchange 400 is depicted. As discussed above, computing nodes 120 may provide various encoding capabilities 202 to distribution engine 112 in order to facilitate determining how recorded content 114 should be offloaded. In some embodiments, in order to ensure that one or more of these capabilities 202 are accurate, some of this information may be included in a signed attestation provided by a computing node 120. Accordingly, in the illustrated embodiment, a computing node 120 (such as phone 120E) may contact a trusted certificate authority 410 to obtain a signed certificate 412 attesting to one or more of its capabilities 202 and present the certificate 412 to distribution engine 112.

Trusted certificate authority (CA) 410, in various embodiments, is a trusted computing system configured to issue signed certificates 412. In some embodiments, CA 410 may be operated by a manufacturer of recording device 110, a computing node 120, and/or presenting device 140; however, in other embodiments, CA 410 may be operated by some other trusted entity. In various embodiments, a computing node 120 may obtain a certificate 412 by generating a public-key pair having a public key 414A and a corresponding private key 414B and issuing a certificate signing request (CSR) to CA 410. In some embodiments, the CSR is further signed by a trusted key maintained by a computing node 120 in order to establish trust with CA 410. Such a trusted key, for example, may be stored in a computing node 120 during its manufacturing. In some embodiments, this trusted key may be unique to a given computing node 120 (or, in another embodiment, unique to a particular generation of devices being of the same type—i.e., devices of the same type and generation may store the same key). Once the CSR can be successfully verified, CA 410 may issue a corresponding certificate 412, which may be signed using a trusted private key maintained by CA 410.

Certificate 412 may include any suitable information usable by distribution engine 112 such as one or more of parameters 202A-202D discussed above. For example, certificate 412 may specify that a computing node 120 includes secure hardware (e.g., secure element 640 discussed below with respect to FIG. 6, HSM, secure processor, etc.) as a security capability 202D. As another example, certificate 412 may specify a task affinity 202A for performing neural-network related tasks as the computing node 120 may include specialized hardware implementing a neural network engine. In some embodiments, certificate 412 may include manufacturer information attesting to a computing node 120 being a genuine device such as identifying the name of the manufacturer and confirming that the authenticity of the computing node 120 has been verified. The manufacturer information may also identify product generation information, which may be used to identify what hardware, software, etc. is included in computing device 120. Certificate 412 may also include public key 414A, a digital signature generated using private key 414B, and the digital signature of CA 410 (i.e., generated by CA 410's private key) mentioned above. In some embodiments, certificate 412 may be X.509 compliant; however, in other embodiments, certificate 412 may be implemented using some other form of signed attestation.

Once certificate 412 has been received, distribution engine 112 may verify certificate 412 to ensure that its authenticity. This may include verifying the signature of CA 410 to ensure the integrity of certificate 412's content. In some embodiments, distribution engine 112 may further authenticate a computing node 120 by issuing a challenge to the computing node 120 to perform a cryptographic operation using private key 414A of the public-key pair and validating a result (e.g., a digital signature) of the cryptographic operation using public key 414A of the public-key pair. If the verification is successful, distribution engine 112 may determine to offload recorded content 114 the computing node 120 for encoding—and assign encoding operations having encoding constraints 214 matching capabilities 202 identified in certificate 412. In some embodiments, recording device 110 may also use public key 414A to establish a secure connection with a computing node 120 such as establishing a shared cryptographic key using an Elliptic-Curve Diffie-Hellman (ECDH) exchange.

Figures 5A, 5B:
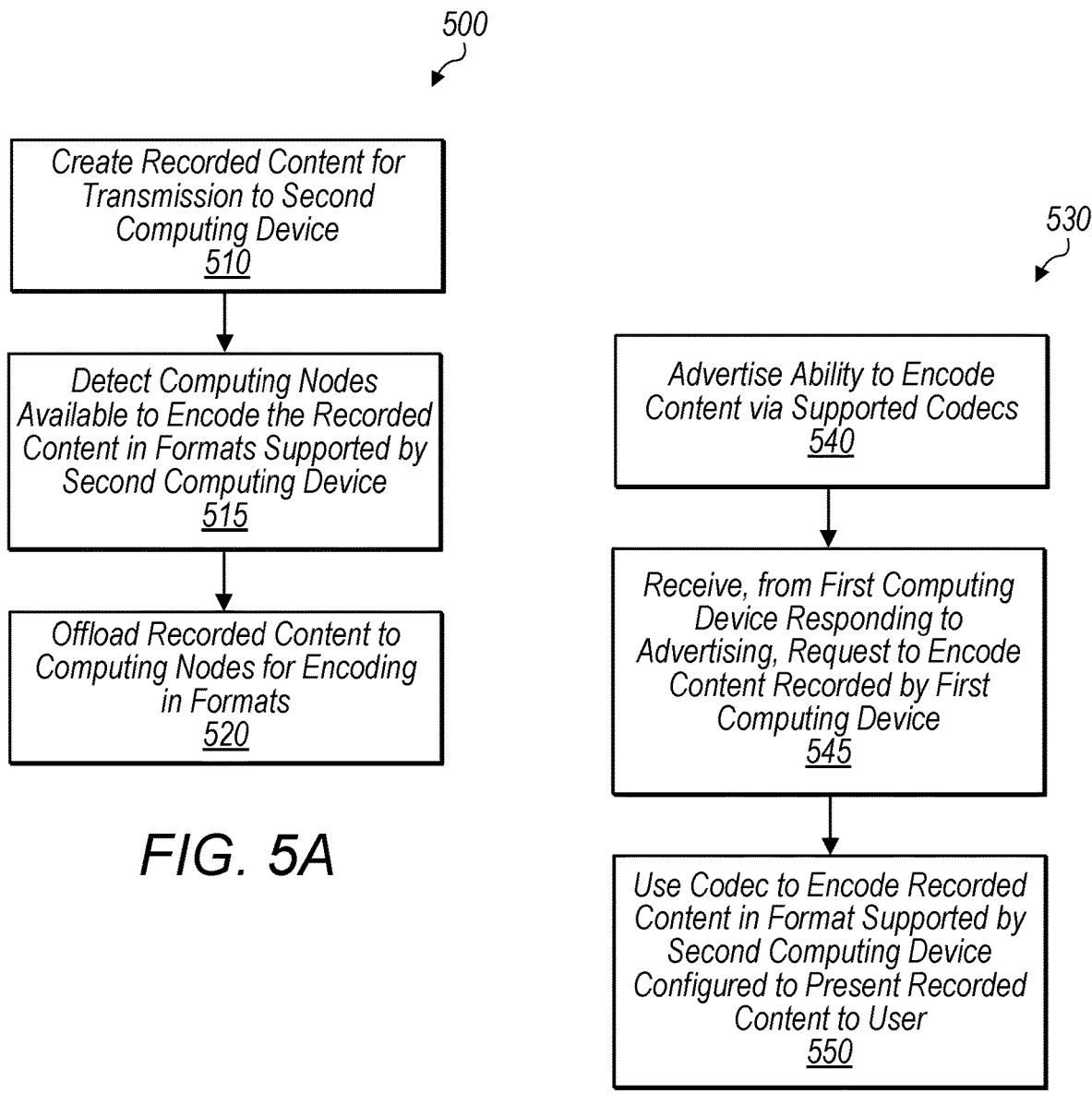
FIGS. 5A-5C are flow diagrams illustrating embodiments of methods performed by components associated with the distributed encoding system.

Turning now to FIG. 5A, a flow diagram of a method 500 is depicted. Method 500 is one embodiment of a method that may be performed by a computing device recording content, such as recording device 110. In many instances, performance of method 500 may allow recorded content to be encoded more quickly using greater compute resources.

In step 505, a first computing device creates recorded content (e.g., recorded content 114) for transmission to a second computing device (e.g., presenting device 140) configured to present the recorded content. In various embodiments, the first computing device is a head mounted display (HMD) configured to record the content using one or more forward facing cameras (e.g., world sensors 604) included in the HMD. In some embodiments, the first computing device collects sensor data from one or more sensors included in the HMD, the sensor data indicating an orientation of the HMD during creating the recorded content. In such an embodiment, the first computing device provides the sensor data to the one or more computing nodes for inclusion in the encoded content, the included sensor data being usable by the second computing device to orientate presentation of the recorded content.

In step 510, the first computing device detects, via a network interface (e.g., network interface 650) of the first computing device, one or more computing nodes (e.g., computing nodes 120) available to encode the recorded content in one or more formats supported by the second computing device. In various embodiments, the detecting includes the first computing device receiving, from a computing node, an indication (e.g., task affinities 202A) of one or more formats supported by the computing node (e.g., via codecs 322) and, based on the one or more supported formats, determining whether to offload the recorded content to the computing node for encoding. In some embodiments, the detecting includes the first computing device receiving, from a computing node (e.g., wireless speaker 120A), compute information (e.g., compute 202B) identifying a current utilization of one or more compute resources included in the computing node and that are usable to facilitate encoding of the recorded content by the computing node and, based on the compute information, determining whether to offload the recorded content to the computing node for encoding. In some embodiments, the detecting includes the first computing device receiving, from a computing node, an indication (e.g., security 202D) of a user associated with the computing node, determining whether the user corresponds a user of the first computing device, and based on the determining, determining whether to offload the recorded content to the computing node for encoding the recording content. In some embodiments, the detecting includes the first computing device receiving, from a computing node, a signed attestation (e.g., capabilities certificate) identifying a presence of secure hardware (e.g., secure element 640) within the computing node and, based on the signed attestation, determining whether to offload the recorded content to the computing node for encoding the recording content. In some embodiments, prior to creating the recorded content, the first computing device determines that a user of the first computing device is likely to begin creating the recorded content and, based on the determining, attempts to detect the one or more computing nodes to facilitate a subsequent encoding of the recorded content.

In step 515, the first computing device offloads the recorded content via the network interface to the one or more computing nodes for encoding in the one or more formats. In some embodiments, while the computing node encodes the offloaded recorded content in a first format, the first computing device receives, from the computing node, updated compute information identifying a current utilization (e.g., compute 202B) of the one or more compute resources and, based on the updated compute information, selects a second, different format to be used by the computing node for encoding the recorded content. In various embodiments, while offloading the recorded content to the one or more computing nodes, the first computing device detects another computing node (e.g., workstation 120B) available to encode the recorded content and offloads the recorded content to the other computing node for encoding the recorded content.

Turning now to FIG. 5B, a flow diagram of a method 530 is depicted. Method 530 is one embodiment of a method that may be performed by a computing node assisting a recording device, such as a computing node 120. In many instances, performance of method 530 may allow recorded content to be encoded more quickly using greater compute resources.

In step 535, a computing node advertises, via a network interface (e.g., network interface 680) of the computing node, an ability to encode content via one or more supported codecs (e.g., codecs 322). In some embodiments, the computing node provides, to a first computing device (e.g., recording device 110), information (e.g., QoS 202C) indicative of a quality of service for a network connection established with the first computing device via the network interface, and the information is usable by the first computing device in determining whether to offload recorded content to the computing node. In some embodiments, the computing node provides, to the first computing device, an indication (e.g., security 202D) of a user account registered to the computing node, and the indication is usable by the first computing device in determining whether to offload recorded content to the computing node. In some embodiments, the computing node provides, to the first computing device, a signed attestation (e.g., capabilities certificate 412) identifying a manufacturer of the computing node and usable to determine hardware present in the computing node, and the signed attestation is usable by the first computing device in determining whether to offload recorded content to the computing node.

In step 540, the computing node receives, from a first computing device (e.g., recording device 110) responding to the advertising, a request (e.g., an encoding request 232) to encode content recorded by the first computing device.

In step 545, in response to the request, the computing node uses one of the supported codecs to encode the recorded content in a format supported by a second computing device (e.g., presenting device 140 as well one or more additional devices) configured to present the recorded content to a user. In some embodiments, the computing node stores segments (e.g., encoded segments 124) of the encoded recorded content in a storage (e.g., storage 130) accessible to the second computing device and updates a manifest (e.g., manifest 132) in the storage to identify the format in which the recorded content is encoded, the manifest being usable by the second computing device to select the encoded recorded content for downloading by the second computing device. In some embodiments, the computing node sends the encoded recorded content to the second computing device for presentation to the user.

Figure 5C:
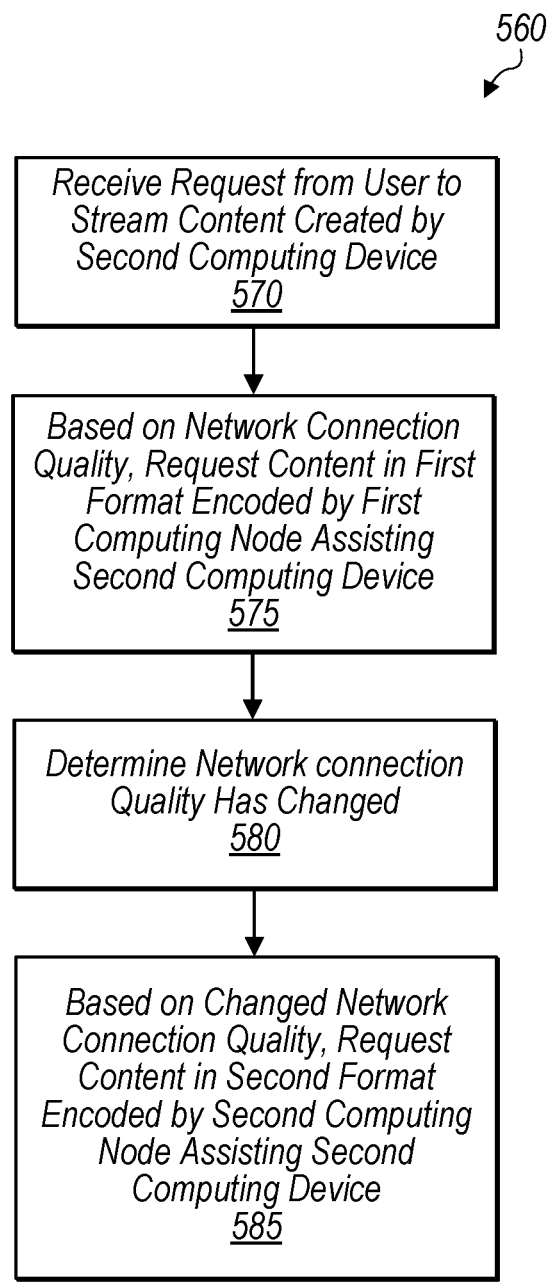

Turning now to FIG. 5C, a flow diagram of a method 560 is depicted. Method 560 is one embodiment of a method that may be performed by a device presenting encoded content, such as presenting device 140. In many instances, performance of method 560 may allow a user accessing presented content to have a better user experience.

Method 560 begins, in step 565, with a first computing device receiving a request from a user to stream content (e.g., recorded content 114) recorded by a second computing device (e.g., recording device 110). In step 570, the first computing device requests the content in a first format (e.g. H.264 at 720p) based on a quality of a network connection of the first computing device (and a display resolution, etc.), the content in the first format being encoded by a first computing node (e.g., wireless speaker 120A) assisting the second computing device. In step 575, the computing device determines that the quality of the network connection has changed. In step 580, the first computing device requests the content in a second format (e.g. H.264 at 1080p) based on the changed quality of the network connection, the content in the second format being encoded by a second computing node (e.g., workstation 120B) assisting the second computing device. In various embodiments, method 560 includes the first computing device downloading a manifest (e.g., manifest 132) identifying segments (e.g., encoded segments 124) of the encoded content in the first format and segments of the content in the second format and the first computing device using the manifest to select one of the first and second formats for streaming. In some embodiments, the encoded content includes sensor data identifying an orientation of a camera used by the second computing device to record the content, and method 560 further includes the first computing device using the sensor data to facilitate presenting the streamed content to a user of the first computing device. In some embodiments, the first computing device is a head mounted display (HMD) configured to present the streamed content based on the orientation identified in the sensor data and an orientation of the HMD.

Figure 6:
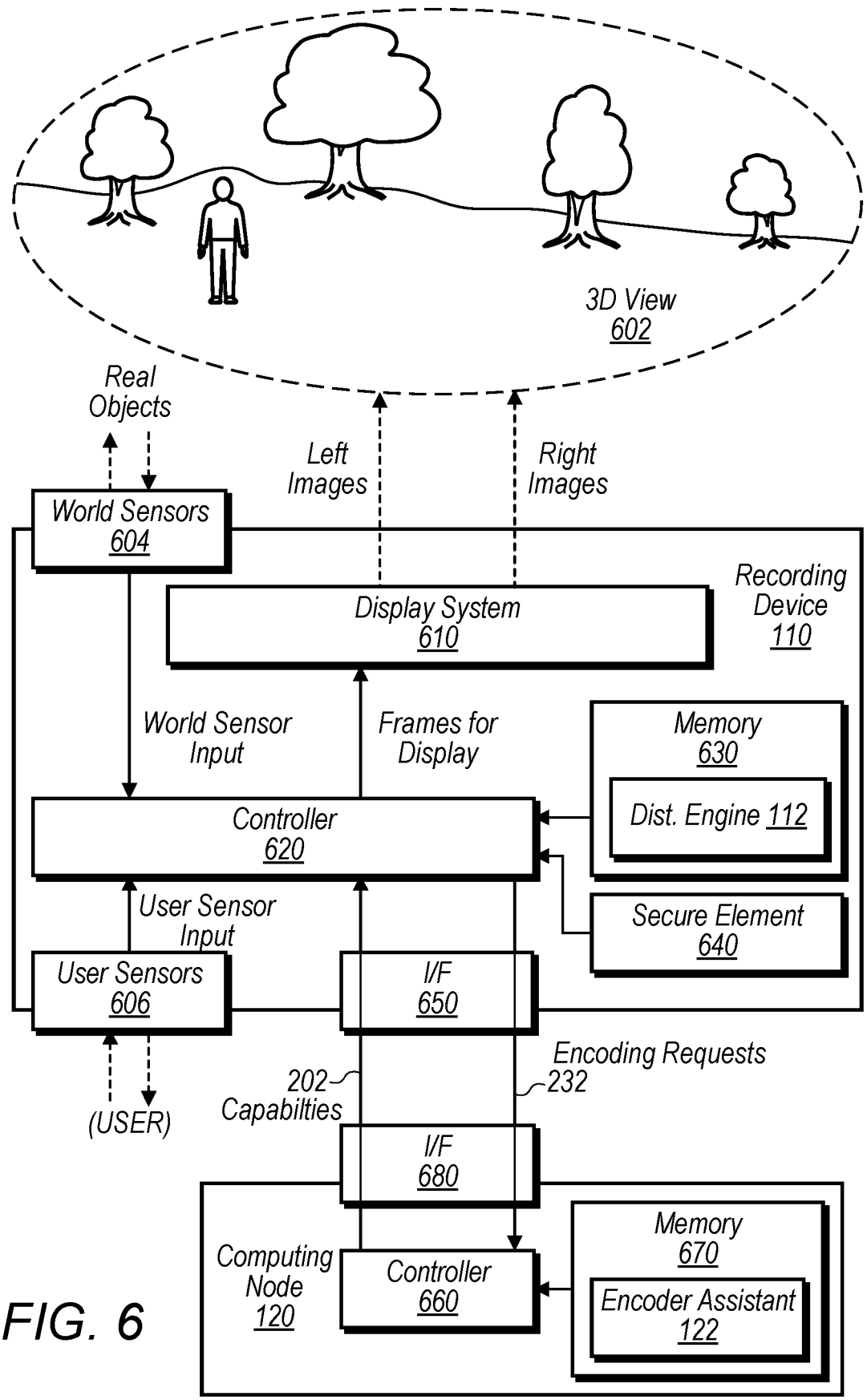
FIG. 6 is a block diagram illustrating one embodiment of exemplary components included the recording device and the computing node.

Turning now to FIG. 6, a block diagram of components within recording device 110 and a computing node 120 is depicted. In some embodiments, recording device 110 is a head-mounted display (HMD) configured to be worn on the head and to display content, such as a 3D view 602, to a user. For example, device 110 may be a headset, helmet, goggles, glasses, a phone inserted into an enclosure, etc. worn by a user. As noted above, however, recording device 110 may correspond to other devices in other embodiments, which may include one or more of components 604-650. In the illustrated embodiment, device 110 includes world sensors 604, user sensors 606, a display system 610, controller 620, memory 630, secure element 640, and a network interface 650. As shown, a given computing node 120 (or presenting device 140 in some embodiments) includes a controller 660, memory 670, and network interface 680. In some embodiments, device 110 and computing nodes 120 may be implemented differently than shown. For example, device 110 and/or computing node 120 may include multiple network interfaces 650, device 110 may not include a secure element 640, computing node 120 may include a secure element 640, etc.

World sensors 604, in various embodiments, are sensors configured to collect various information about the environment in which a user wears device 110 and may be used to create recorded content 114. In some embodiments, world sensors 604 may include one or more visible-light cameras that capture video information of the user's environment. This information also may, for example, be used to provide a virtual view of the real environment, detect objects and surfaces in the environment, provide depth information for objects and surfaces in the real environment, provide position (e.g., location and orientation) and motion (e.g., direction and velocity) information for the user in the real environment, etc. In some embodiments, device 110 may include left and right cameras located on a front surface of the device 110 at positions that are substantially in front of each of the user's eyes. In other embodiments, more or fewer cameras may be used in device 110 and may be positioned at other locations. In some embodiments, world sensors 604 may include one or more world mapping sensors (e.g., infrared (IR) sensors with an IR illumination source, or Light Detection and Ranging (LIDAR) emitters and receivers/detectors) that, for example, capture depth or range information for objects and surfaces in the user's environment. This range information may, for example, be used in conjunction with frames captured by cameras to detect and recognize objects and surfaces in the real-world environment, and to determine locations, distances, and velocities of the objects and surfaces with respect to the user's current position and motion. The range information may also be used in positioning virtual representations of real-world objects to be composited into a virtual environment at correct depths. In some embodiments, the range information may be used in detecting the possibility of collisions with real-world objects and surfaces to redirect a user's walking. In some embodiments, world sensors 604 may include one or more light sensors (e.g., on the front and top of device 110) that capture lighting information (e.g., direction, color, and intensity) in the user's physical environment. This information, for example, may be used to alter the brightness and/or the color of the display system in device 110.

User sensors 606, in various embodiments, are sensors configured to collect various information about a user wearing device 110 and may be used to produce recorded content 114. In some embodiments, user sensors 606 may include one or more head pose sensors (e.g., IR or RGB cameras) that may capture information about the position and/or motion of the user and/or the user's head. The information collected by head pose sensors may, for example, be used in determining how to render and display views of the virtual environment and content within the views. For example, different views of the environment may be rendered based at least in part on the position of the user's head, whether the user is currently walking through the environment, and so on. As another example, the augmented position and/or motion information may be used to composite virtual content into the scene in a fixed position relative to the background view of the environment. In some embodiments there may be two head pose sensors located on a front or top surface of the device 110; however, in other embodiments, more (or fewer) head-pose sensors may be used and may be positioned at other locations. In some embodiments, user sensors 606 may include one or more eye tracking sensors (e.g., IR cameras with an IR illumination source) that may be used to track position and movement of the user's eyes. In some embodiments, the information collected by the eye tracking sensors may be used to adjust the rendering of images to be displayed, and/or to adjust the display of the images by the display system of the device 110, based on the direction and angle at which the user's eyes are looking. In some embodiments, the information collected by the eye tracking sensors may be used to match direction of the eyes of an avatar of the user to the direction of the user's eyes. In some embodiments, brightness of the displayed images may be modulated based on the user's pupil dilation as determined by the eye tracking sensors. In some embodiments, user sensors 606 may include one or more eyebrow sensors (e.g., IR cameras with IR illumination) that track expressions of the user's eyebrows/forehead. In some embodiments, user sensors 606 may include one or more lower jaw tracking sensors (e.g., IR cameras with IR illumination) that track expressions of the user's mouth/jaw. For example, in some embodiments, expressions of the brow, mouth, jaw, and eyes captured by sensors 606 may be used to simulate expressions on an avatar of the user in a co-presence experience and/or to selectively render and composite virtual content for viewing by the user based at least in part on the user's reactions to the content displayed by device 110. In some embodiments, user sensors 606 may include one or more hand sensors (e.g., IR cameras with IR illumination) that track position, movement, and gestures of the user's hands, fingers, and/or arms. For example, in some embodiments, detected position, movement, and gestures of the user's hands, fingers, and/or arms may be used to simulate movement of the hands, fingers, and/or arms of an avatar of the user in a co-presence experience. As another example, the user's detected hand and finger gestures may be used to determine interactions of the user with virtual content in a virtual space, including but not limited to gestures that manipulate virtual objects, gestures that interact with virtual user interface elements displayed in the virtual space, etc.

Display system 610, in various embodiments, is configured to display rendered frames to a user. Display 610 may implement any of various types of display technologies. For example, as discussed above, display system 610 may include near-eye displays that present left and right images to create the effect of three-dimensional view 602. In some embodiments, near-eye displays may use digital light processing (DLP), liquid crystal display (LCD), liquid crystal on silicon (LCoS), or light-emitting diode (LED). As another example, display system 610 may include a direct retinal projector that scans frames including left and right images, pixel by pixel, directly to the user's eyes via a reflective surface (e.g., reflective eyeglass lenses). To create a three-dimensional effect in view 602, objects at different depths or distances in the two images are shifted left or right as a function of the triangulation of distance, with nearer objects shifted more than more distant objects. Display system 610 may support any medium such as an optical waveguide, a hologram medium, an optical combiner, an optical reflector, or any combination thereof. In some embodiments, display system 610 may be the transparent or translucent and be configured to become opaque selectively.

Controller 620, in various embodiments, includes circuitry configured to facilitate operation of device 110. Accordingly, controller 620 may include one or more processors configured to execute program instructions, such as distribution engine 112, to cause device 110 to perform various operations described herein. These processors may be CPUs configured to implement any suitable instruction set architecture, and may be configured to execute instructions defined in that instruction set architecture. For example, in various embodiments controller 620 may include general-purpose or embedded processors implementing any of a variety of instruction set architectures (ISAs), such as ARM, x86, PowerPC, SPARC, RISC, or MIPS ISAs, or any other suitable ISA. In multiprocessor systems, each of the processors may commonly, but not necessarily, implement the same ISA. Controller 620 may employ any microarchitecture, including scalar, superscalar, pipelined, superpipelined, out of order, in order, speculative, non-speculative, etc., or combinations thereof. Controller 620 may include circuitry to implement microcoding techniques. Controller 620 may include one or more levels of caches, which may employ any size and any configuration (set associative, direct mapped, etc.). In some embodiments, controller 620 may include at least GPU, which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 620 may include one or more other components for processing and rendering video and/or images, for example image signal processors (ISPs), coder/decoders (codecs), etc. In some embodiments, controller 620 may be implemented as a system on a chip (SOC).

Memory 630, in various embodiments, is a non-transitory computer readable medium configured to store data and program instructions executed by processors in controller 620 such as distribution engine 112. Memory 630 may include any type of volatile memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. Memory 630 may also be any type of non-volatile memory such as NAND flash memory, NOR flash memory, nano RAM (NRAM), magneto-resistive RAM (MRAM), phase change RAM (PRAM), Racetrack memory, Memristor memory, etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Secure element (SE) 640, in various embodiments, is a secure circuit configured perform various secure operations for device 110. As used herein, the term "secure circuit" refers to a circuit that protects an isolated, internal resource from being directly accessed by an external circuit such as controller 620. This internal resource may be memory that stores sensitive data such as personal information (e.g., biometric information, credit card information, etc.), encryptions keys, random number generator seeds, etc. This internal resource may also be circuitry that performs services/operations associated with sensitive data such as encryption, decryption, generation of digital signatures, etc. For example, SE 640 may maintain one or more cryptographic keys that are used to encrypt data stored in memory 630 in order to improve the security of device 110. As another example, secure element 640 may also maintain one or more cryptographic keys to establish secure connections between recording device 110 and computing nodes 120, authenticate device 110 or a user of device 110, etc. As yet another example, SE 640 may maintain biometric data of a user and be configured to perform a biometric authentication by comparing the maintained biometric data with biometric data collected by one or more of user sensors 606. As used herein, "biometric data" refers to data that uniquely identifies the user among other humans (at least to a high degree of accuracy) based on the user's physical or behavioral characteristics such as fingerprint data, voice-recognition data, facial data, iris-scanning data, etc.

Network interface 650, in various embodiments, includes one or more interfaces configured to communicate with external entities such as computing nodes 120. Network interface 650 may support any suitable wireless technology such as Wi-Fi®, Bluetooth®, Long-Term Evolution™, etc. or any suitable wired technology such as Ethernet, Fibre Channel, Universal Serial Bus™ (USB) etc. In some embodiments, interface 650 may implement a proprietary wireless communications technology (e.g., 60 gigahertz (GHz) wireless technology) that provides a highly directional wireless connection between the recording device 110 and one or more of computing nodes 120. In some embodiments, device 110 may select between different available network interfaces based on connectivity of the interfaces as well as the particular user experience being delivered by device 110. For example, if a particular user experience requires a high amount of bandwidth, device 110 may select a radio supporting the proprietary wireless technology when communicating wirelessly with high performance compute 120D. If, however, a user is merely streaming a movie, Wi-Fi® may be sufficient and selected by device 110. In some embodiments, device 110 may use compression to communicate in instances, for example, in which bandwidth is limited.

Controller 660, in various embodiments, includes circuitry configured to facilitate operation of device 110. Controller 660 may implement any of the functionality described above with respect to controller 620. For example, controller 660 may include one or more processors configured to execute program instructions to cause computing node 120 to perform various operations described herein such as executing encoder assistant 122 to encode recorded content 114.

Memory 670, in various embodiments, is configured to store data and program instructions executed by processors in controller 660. Memory 670 may include any suitable volatile memory and/or non-volatile memory such as those noted above with memory 630. Memory 670 may be implemented in any suitable configuration such as those noted above with memory 630.

Network interface 680, in various embodiments, includes one or more interfaces configured to communicate with external entities such as device 110 as well as other computing nodes 120. Network interface 680 may also implement any of suitable technology such as those noted above with respect to network interface 650.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein that are executable by a first computing device to cause the first computing device to perform operations comprising:
    creating recorded content for transmission to a second computing device configured to present the recorded content;
    dynamically discovering, via a network interface of the first computing device, one or more computing nodes that satisfy a set of availability criteria indicating that the one or more computing nodes are available to handle workload relating to encoding the recorded content in one or more formats supported by the second computing device;
    offloading, via the network interface, workload relating to the recorded content to at least one of the one or more discovered computing nodes; and
    redistributing the offloaded workload in response to a change in location of the first computing device.

2. The computer readable medium of claim 1, wherein the dynamically discovering includes:
    receiving, from a particular computing node, an indication of one or more formats supported by the particular computing node; and
    wherein the offloading includes:
    determining, based on the one or more supported formats, whether to offload the recorded content to the particular computing node for encoding.

3. The computer readable medium of claim 1, wherein the dynamically discovering includes:
    receiving, from a particular computing node, compute information identifying a current utilization of one or more compute resources included in the computing node and that are usable to facilitate encoding of the recorded content by the particular computing node; and
    wherein the offloading includes:
    determining, based on the compute information, whether to offload the recorded content to the particular computing node for encoding.

4. The computer readable medium of claim 3, wherein the operations further comprise:
    while the particular computing node encodes the offloaded recorded content in a first format, receiving, from the computing node, updated compute information identifying a current utilization of the one or more compute resources; and
    based on the updated compute information, selecting a second, different format to be used by the particular computing node for encoding the recorded content.

5. The computer readable medium of claim 1, wherein the dynamically discovering includes:
    receiving, from a particular computing node, an indication of a user associated with the computing node;
    determining whether the user corresponds to a user of the first computing device; and
    based on the determining, determining whether to offload the recorded content to the particular computing node for encoding the recorded content.

6. The computer readable medium of claim 1, wherein the dynamically discovering includes:
    receiving, from a particular computing node, a signed attestation identifying a presence of secure hardware within the computing node; and
    based on the signed attestation, determining whether to offload the recorded content to the particular computing node for encoding the recorded content.

7. The computer readable medium of claim 1, wherein the dynamically discovering occurs during the creating.

8. The computer readable medium of claim 1, wherein the dynamically discovering includes, prior to creating the recorded content:
    determining that a user of the first computing device is likely to begin creating the recorded content; and
    based on the determining, attempting to detect the one or more computing nodes to facilitate a subsequent encoding of the recorded content.

9. The computer readable medium of claim 1, wherein the first computing device is a head mounted display (HMD) configured to record the content using one or more cameras included in the HMD.

10. The computer readable medium of claim 1, wherein the redistributing includes:
repeating the dynamically discovering after the change in location of the first computing device to discover at least one newly discovered computing node that satisfy the set of availability criteria; and
reallocating at least a portion of the offloaded workload from at least one previously discovered computing node to the at least one newly discovered computing node.

11. A method, comprising:
creating, by a first computing device, recorded content for transmission to a second computing device configured to present the recorded content;
discovering, via a network interface of the first computing device, one or more computing nodes that satisfy a set of availability criteria indicating that the one or more computing nodes are available to handle workload relating to encoding the recorded content in one or more formats supported by the second computing device;
offloading, by the first computing device via the network interface, workload relating to the recorded content to at least one of the one or more discovered computing nodes;
repeating, via the network interface of the first computing device, the discovering after a change in location of the first computing device; and
redistributing, by the first computing device, the offloaded workload after the repeating.

12. The method of claim 11, wherein the first computing device is a head-mounted device, the method further comprising:
providing sensor data collected by the head-mounted device to the one or more computing nodes for inclusion in the recorded content, the sensor data being indicative of an orientation of the head-mounted device during the creating of the recorded content.

13. The method of claim 11, wherein at least a portion of the discovering occurs prior to beginning the creating of the recorded content.

14. The method of claim 11, wherein the discovering includes receiving, from a particular computing node that has been discovered, an indication of one or more formats supported by the particular computing node; and
wherein the offloading includes, determining, based on the one or more supported formats, whether to offload the recorded content to the particular computing node for encoding.

15. The method of claim 11, wherein the discovering includes receiving, from a particular computing node that has been discovered, compute information identifying a current utilization of one or more compute resources included in the computing node and that are usable to facilitate encoding of the recorded content by the particular computing node; and
wherein the offloading includes, determining, based on the received compute information, whether to offload the recorded content to the particular computing node for encoding.

16. The method of claim 11, wherein repeating the discovering includes detecting one or more newly discovered computing nodes, and wherein the redistributing includes assigning work from one or more previously discovered computing nodes to the one or more newly discovered computing nodes.

17. A non-transitory computer readable medium having program instructions stored therein that are executable by a first computing device to cause the first computing device to perform operations comprising:
creating recorded content for transmission to a second computing device configured to present the recorded content;
detecting, via a network interface of the first computing device, one or more computing nodes available to encode the recorded content in one or more formats supported by the second computing device, wherein the detecting includes:
receiving, from a particular computing node, an indication of a user associated with the computing node;
determining whether the user corresponds to a user of the first computing device; and
based on the determining, determining whether to offload the recorded content to the particular computing node for encoding the recording content; and
offloading the recorded content via the network interface to the one or more computing nodes for encoding in the one or more formats.

18. A non-transitory computer readable medium having program instructions stored therein that are executable by a first computing device to cause the first computing device to perform operations comprising:
creating recorded content for transmission to a second computing device configured to present the recorded content;
detecting, via a network interface of the first computing device, one or more computing nodes available to encode the recorded content in one or more formats supported by the second computing device, wherein the detecting includes:
receiving, from a particular computing node, a signed attestation identifying a presence of secure hardware within the particular computing node; and
based on the signed attestation, determining whether to offload the recorded content to the particular computing node for encoding the recording content; and
offloading the recorded content via the network interface to the one or more computing nodes for encoding in the one or more formats.

19. A non-transitory computer readable medium having program instructions stored therein that are executable by a first computing device to cause the first computing device to perform operations comprising:
determining that a user of the first computing device is likely to begin creating recorded content for transmission to a second computing device configured to present the recorded content; and
based on the determining, attempting to detect one or more computing nodes to facilitate a subsequent encoding of the recorded content,
after the attempting:
creating recorded content for transmission to the second computing device;
detecting, via a network interface of the first computing device, one or more computing nodes available to encode the recorded content in one or more formats supported by the second computing device; and
offloading the recorded content via the network interface to the one or more computing nodes for encoding in the one or more formats.

20. A non-transitory computer readable medium having program instructions stored therein that are executable by a first computing device that includes a head mounted display (HMD) to cause the first computing device to perform operations comprising:
- creating, using one or more cameras of the HMD, recorded content for transmission to a second computing device configured to present the recorded content;
- collecting sensor data from one or more sensors included in the HMD, wherein the sensor data indicates an orientation of the HMD while creating the recorded content;
- detecting, via a network interface of the first computing device, one or more computing nodes available to encode the recorded content in one or more formats supported by the second computing device;
- providing the sensor data to the one or more computing nodes for inclusion in the recorded content, wherein the included sensor data is usable by the second computing device to orientate presentation of the recorded content; and
- offloading the recorded content via the network interface to the one or more computing nodes for encoding in the one or more formats.

* * * * *